(12) United States Patent
Carlson et al.

(10) Patent No.: US 8,712,592 B2
(45) Date of Patent: Apr. 29, 2014

(54) CONTROLLING A RESOURCE DEMAND SYSTEM

(75) Inventors: Peter Carlson, Petaluma, CA (US); Christopher Spain, Petaluma, CA (US); Danny A Dansereau, Providence, UT (US)

(73) Assignee: HydroPoint Data Systems, Inc., Petaluma, CA (US)

( * ) Notice: Subject to any disclaimer, the term of this patent is extended or adjusted under 35 U.S.C. 154(b) by 342 days.

(21) Appl. No.: 13/075,127

(22) Filed: Mar. 29, 2011

(65) Prior Publication Data

US 2012/0253529 A1 Oct. 4, 2012

(51) Int. Cl.
*G05D 11/00* (2006.01)
*G05B 11/01* (2006.01)
*A01G 27/00* (2006.01)

(52) U.S. Cl.
USPC .............................. 700/284; 700/12; 239/69

(58) Field of Classification Search
USPC ...................................... 700/284, 12; 239/69
See application file for complete search history.

(56) References Cited

U.S. PATENT DOCUMENTS

| | | | | |
|---|---|---|---|---|
| 6,314,340 | B1 * | 11/2001 | Mecham et al. | 700/284 |
| 7,532,954 | B2 * | 5/2009 | Evelyn-Veere | 700/284 |
| 7,769,494 | B1 * | 8/2010 | Simon et al. | 700/284 |
| 2003/0208306 | A1 * | 11/2003 | Addink et al. | 700/284 |
| 2004/0039489 | A1 * | 2/2004 | Moore et al. | 700/284 |
| 2007/0055407 | A1 * | 3/2007 | Goldberg et al. | 700/284 |
| 2008/0091307 | A1 * | 4/2008 | Dansereau et al. | 700/284 |
| 2009/0234512 | A1 * | 9/2009 | Ewing et al. | 700/295 |
| 2011/0088315 | A1 * | 4/2011 | Donoghue | 47/48.5 |
| 2011/0093123 | A1 * | 4/2011 | Alexanian | 700/284 |
| 2012/0072036 | A1 * | 3/2012 | Piper et al. | 700/284 |

* cited by examiner

*Primary Examiner* — Kavita Padmanabhan
*Assistant Examiner* — Jason Lin
(74) *Attorney, Agent, or Firm* — Brian R. Short

(57) ABSTRACT

Methods of controlling a resource demand system are disclosed. One method includes obtaining weather data from at least one data source that collects weather data at a plurality of areas. A weather value for a target location is calculated from the weather data. A weather value is sensed for the target location. The calculated weather value is compared with the sensed weather value to validate at least one of the calculated weather value and the sensed weather value, and a control value is calculated based on at least one of the calculated weather value and the sensed weather value.

19 Claims, 8 Drawing Sheets

CONTROLLING A RESOURCE DEMAND SYSTEM

FIELD OF THE INVENTION

The present invention generally relates to resources. More specifically, the invention relates to controlling a resource demand system.

BACKGROUND OF THE INVENTION

Typically, weather data, such as temperature or atmospheric pressure, is measured from a physical weather station or other physical weather value measuring device at a particular location. This weather data provided is generally collected, stored and made available to a user. The user upon collecting or receiving the weather data can further analyze, or make additional calculations using this weather data. For example, a user might take one or more weather values, such as temperature and calculate Evapotranspiration (ET), or amount of water used by a plant for those measured weather conditions. The user may then manually enter or communicate this value to an irrigation controller which in turn calculates the appropriate amount of irrigation based on the ET and the user input information.

FIG. 1 shows a prior art irrigation system in which a local weather station 112 located within an irrigation area 130 provides weather information that can be used to control an irrigation system 140 within the irrigation (site) area 130. The weather information can be stored in non-local storage 114, but still represents the weather at the site of the irrigation system. The irrigation system can also receive weather values from a non-local data source 116 (such as a satellite), but the data (weather information) of the non-local data source 116 reflects weather of the site (irrigation) area 130. A processor 150 receives the irrigation area weather information and controls the irrigation system 140.

Irrigation systems that include the above-described controller to control the amount of irrigation based on calculated ET can be sub-optimal because the physical weather measuring parameter device may be located somewhere other than where the irrigation area is located. Therefore, the calculated ET may not provide an accurate estimate of the irrigation required because the ET is calculated based on physical weather measurements that do not accurately represent the weather at the irrigation area.

It is desirable to control a resource demand system, wherein weather value calculated for the resource demand system can be validated, adjusted and/or trends identified.

SUMMARY OF THE INVENTION

An embodiment of the invention includes a method of controlling a resource demand system. The method includes obtaining weather data from at least one data source that collects weather data at a plurality of areas. A weather value for a target location is calculated from the weather data. A weather value is sensed at the target location. The calculated weather value and the sensed weather value are validated against each other, and a control value is calculated based on at least one of the calculated weather value and the sensed weather value.

Another embodiment of the invention includes a method of controlling a resource demand system. The method includes obtaining weather data from at least one data source that collects weather data at a plurality of areas. A weather value for a target location is calculated from the weather data. A weather value is sensed at the target location. A control value is calculated based on at least one of the calculated weather value and the sensed weather value. The control value is provided to a control device that controls the resource demand system.

Another embodiment of the invention includes a method for a resource demand system. The method includes obtaining weather data from at least one data source that collects weather data at a plurality of areas. A weather value for a target location is calculated from the weather data. A weather value is sensed at the target location. A plurality of calculated weather values are compared against sensed weather values over time to establish a trend.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the described embodiments will become apparent from the following description of the described embodiments in conjunction with the accompanying drawings.

DETAILED DESCRIPTION

The described embodiments provide methods for controlling a resource demand system. The resource can be, for example, water, and the resource demand system can be, for example, an irrigation system. As described, the resource demand system can be controlled based on calculated and/or sensed weather values. One example of a weather value is Evapotranspiration (ET). Additionally, trends of the calculated weather values and the sensed weather values can be determined over locations and time.

Some of the benefits of the described embodiments include uniquely combining the advantages of both sensed and calculated weather values to increase accuracy, precision and address known inadequacies of each individual and independent approach.

Figure 1:
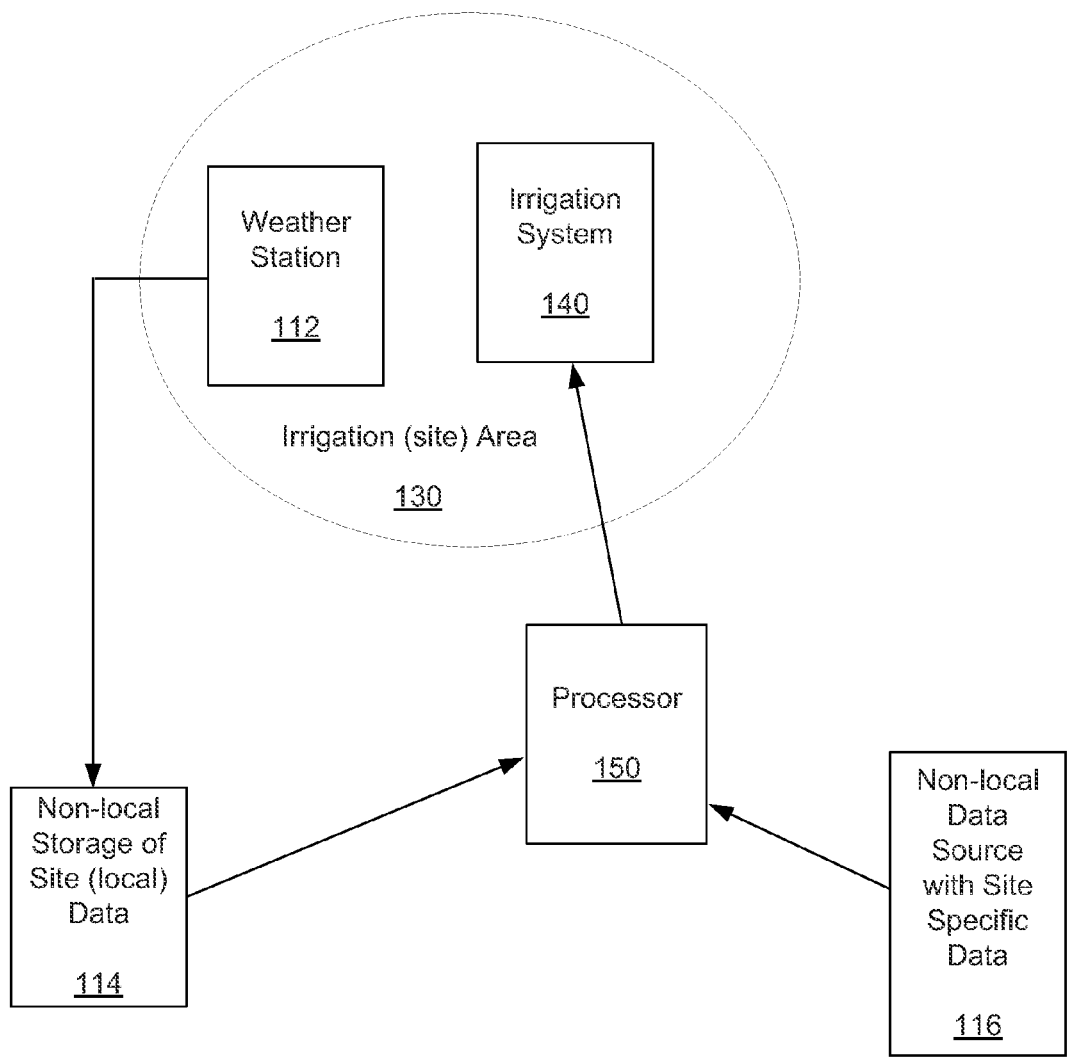
FIG. 1 shows a prior art system for controlling irrigation of an irrigation area.
Figure 2:
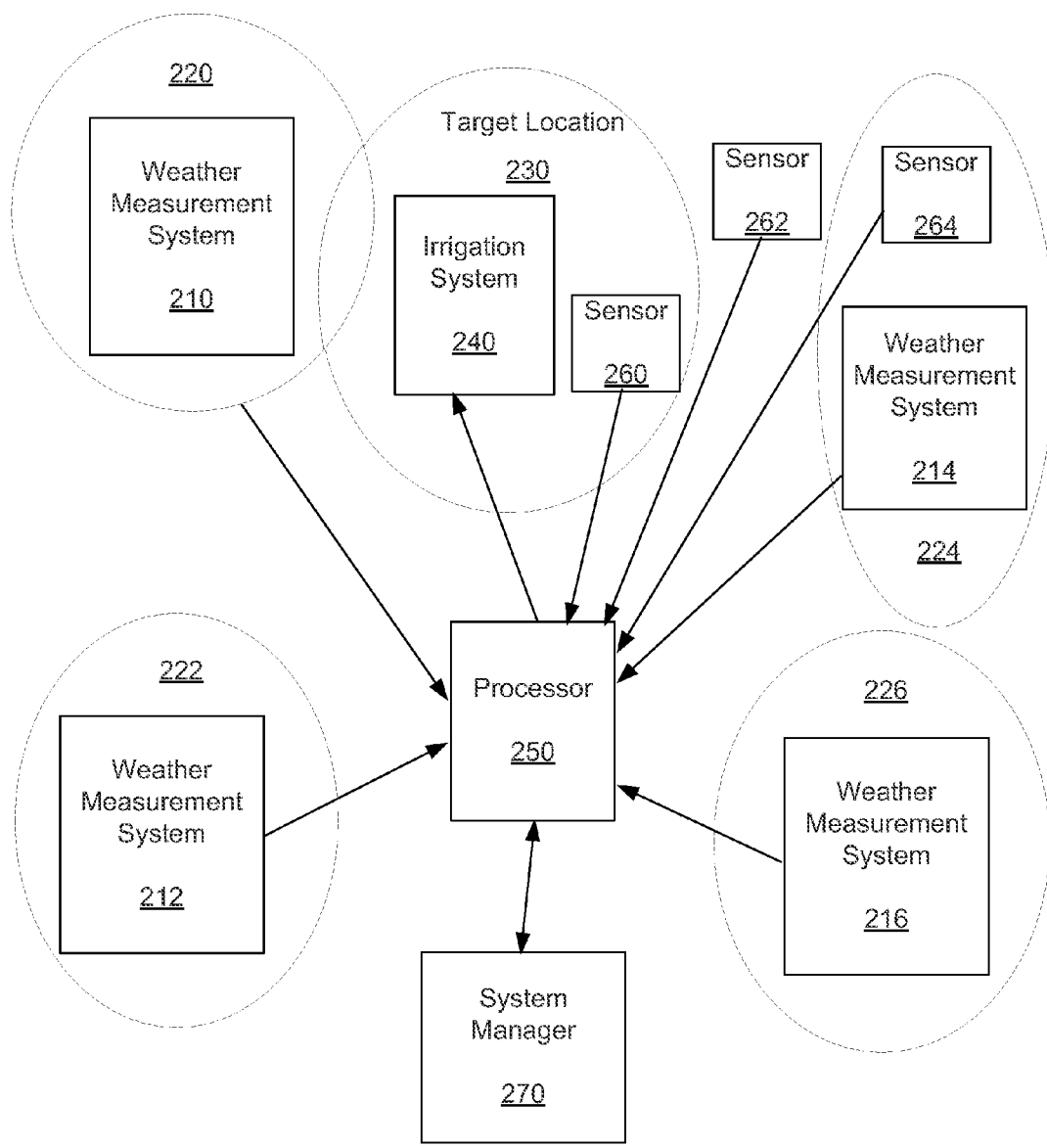
FIG. 2 shows a system for calculating a weather value of a target location based on weather data of areas outside of the target location, that can be validated or adjusted and provided to a control device of a resource demand system.

FIG. 2 shows a system for calculating a weather value for a target location based on weather data of areas outside of the target location. The weather value can be validated or adjusted and provided to a control device of a resource demand system. The system includes weather measurement systems 210, 212, 214, 216 for collecting and/or providing weather data. For the embodiment of FIG. 2, a first weather measurement system 210 is located in a first area 220, a second weather measurement system 212 is located in a second area 222, a third weather measurement system 214 is located in a third area 224, and a fourth weather measurement system 216 is located in a fourth area 226.

As shown in FIG. 2, the weather measurement systems 210, 212, 214, 216 can be located in areas different than a target location (for example, an irrigation area) 230. The four weather measurement systems 210, 212, 214, 216 shown in FIG. 2 are merely examples. That is, there can be more or less weather measurement systems than shown in FIG. 2. However, none of the weather measurement systems are required to be located within the irrigations area 230, nor do they need to provide measurement data from within the irrigation area 230. This is very desirable because weather measurement systems are not always available within irrigation areas. For one embodiment, the weather measurement systems 210, 212, 214, 216 are located in areas that are at different locations than the irrigation area 230.

In addition, it is to be understood that at least one embodiment includes at least one of the weather measurement systems being within or proximate to the target location. For example, weather measurement systems 210 is shown located at a location that is proximate or even overlapping the target location 230.

It should also be noted that the weather data collected by the weather measurement systems 210, 212, 214, 216 can represent weather for areas that are outside of the irrigation area. The weather data representing weather for one or more areas outside the irrigation area can be used to calculate a weather value for an irrigation area. For one embodiment, this calculation can be performed, for example, by executing a numerical weather model in which one or more weather values from outside the irrigation area are used as inputs to the numerical weather model. Exemplary numerical weather models (NWM) may include, but are not limited to, a NCAR/Pen State Meso-scale model 5 (MM5) or a NOAA/NWS Weather Research Forecast (WRF). These and other models are well-known. For another embodiment, an irrigation area weather value can be calculated by interpolating between weather values that each represent weather values in areas outside of the irrigation area.

Examples of weather measurement systems include, for example, weather stations. Generally, a weather station is a facility with instruments and equipment to measure, record, and transmit weather observations. This is done by monitoring and measuring atmospheric conditions. Typical weather stations measure temperature, barometric pressure, humidity, wind speed, wind direction, and precipitation. Advanced weather stations also measure both long wave and short wave solar radiation, and may include soil moisture, soil temperature. Another type of weather measurement systems may be a satellite observations system, aircraft, ships, floating buoys, and balloons called radiosondes.

Generally, a weather value can be defined as data that describes at least one component of the state of the atmosphere or land surface at a given place and time. A non-exhaustive list of examples of weather values includes temperature, barometric pressure, humidity, wind speed, wind direction, precipitation, solar radiation, ground temperature, soil moisture, evapotranspiration (ET) along with the date, time and location that the measurements were taken.

ET can be used to determine the amount of water needed to maintain plant health and conserve water of an area to be irrigated. If the weather values required to compute the ET are not measured at that location (that is, at the irrigation location), then non-optimal or inappropriate irrigation can occur. ET can be calculating using a wide variety of equations, such as, a Penman-Moneith or a Penman-Monteith derived equation. Many of these equations require multiple weather values that are not commonly measured at locations where there are ET calculation requirements. That is, the weather values are not typically available, for example, at an irrigation area where an ET value is desired for determining irrigation requirements for the irrigation area.

One embodiment of calculating ET uses a Penman-Monteith or Penman-Monteith derived equation that is generally used for the calculation of daily values, for example:

$$ET_o = \frac{0.408\Delta(R_n - G) + \gamma\frac{900}{T+273}u_2(e_s - e_a)}{\Delta + \gamma(1 + 0.34u_2)}$$

where $ET_o$ is reference evapotranspiration [mm day$^{-1}$], $R_n$ is net radiation at the crop surface [MJ m$^{-2}$ day$^{-1}$], G is soil heat flux density [MJ m$^{-2}$ day$^{-1}$], T is mean daily air temperature at 2 m height [° C.], $u_2$ is wind speed at 2 m height [m s$^{-1}$], $e_s$ is saturation vapour pressure [kPa], $e_a$ is actual vapour pressure [kPa], $e_s$-$e_a$ saturation vapour pressure deficit [kPa], $\Delta$ slope vapour pressure curve [kPa ° C.$^{-1}$], $\gamma$ psychometric constant [kPa ° C.$^{-1}$].

Evapotranspiration (ET) is defined as the amount of water that evaporates from vegetation (transpiration) and from the underlying soil (evaporation). Evaporation and transpiration occur simultaneously and there is no easy way of distinguishing between the two processes. The combined process, Evapotranspiration (ET) is the numerical value used to control the irrigation within a geographic area. Reference Evapotranspiration is defined as the calculated ET that occurs from a standardized "reference" crop such as clipped grass or alfalfa. The calculation of the Reference ET from the vegetative surfaces, and for standardization purposes, utilizes a short, well-water grass or a taller, well-watered alfalfa crop fort the baseline. The terms suggested for use by the ASCE, for the standardized short reference is ETos, and for the standardized tall reference ETrs. Here, the term ET refers to the calculated Reference Evapotranspiration term ETos.

The ET equation provided as well as many others, require multiple weather data values that are not commonly measured at locations where the ET calculations are required. If the weather data values required for calculation of the ET values are not measured at that location, then non-optimal or inappropriate irrigation can occur. Typically, the weather data needed for these calculations comes from weather stations. However, the weather stations are typically extremely sparse, and often are located at large distances away or in places that are not optimal for local use (that is, use where the irrigation area is located). Therefore, accurate calculated weather values for specific areas is very valuable.

Irrigation systems that use weather data values measured at a location different than the location of the irrigation have other issues as well. For example, the data collected or received does not necessarily accurately reflect the local weather conditions that are applicable to the areas covered by the irrigation system. The weather station may be located in an area where the weather conditions vary significantly from those of the areas covered by the irrigation system. As a result, the weather values which are based on data collected from the weather station may cause the irrigation system to provide irrigation that is not appropriate for the local conditions. Systems that rely upon weather data, must either measure all the weather values for the location of interest, or only use a limited number of measured weather data values. Non-optimal irrigation can result by combining the limited number of measured weather values with measured weather value data from outside the irrigation area.

As shown, the exemplary system of FIG. 2 includes sensors 260, 262, 264 for sensing a weather value for the location of the sensor 260, 262, 264. For one embodiment, the sensor (for example, sensor 260) is located at the target location 230. For another embodiment, the sensor (for example, sensor 262) is additionally, or alternatively, located outside of the target location 230. For another embodiment, the sensor (for example, sensor 264) is additionally, or alternatively, located in an area (such as the third area 224) of a weather measurement system (such as, weather measurement system 214). However, in either case, the sensed weather value(s) provides at least one indication or representation of a weather value within the target location 230.

It is to be understood that the sensed weather value may be based on a correlated value that is easier to measure. For example, one method used to determine wind speed is to determine the rate an anemometer rotates by sensing a magnetic flux. Although the sensed parameter is not directly wind speed, but a highly correlated value representing wind speed. Another example is a soil moisture sensor which may use conductivity to represent soil moisture. Another example is to use satellite imagery at a specific optical frequency to measure the water vapor in the air at a specific location. Another example is to have a human visual observation, such as turf quality, to represent water demand requirements.

Regardless if the sensed value is the actual value or correlated value, the issue is that sensor based measurements are subject to both gradual wear and sudden damage, both of which can cause improper values. There is no efficient way to validate these measurements since they typically require on-site validation and calibration by a skilled technician or full sensor replacement. These value errors can have a significant impact on the accuracy and control efficiency of the resource demand system.

A processor 250 (that can be located anywhere) receives the weather values from the weather measurement systems 210, 212, 214, 216 (either directly or indirectly) and computes, for example, an ET value at a point or area. The processor 250 can additionally receive at least one sensed weather value from the sensors 260, 262, 264, and compares the at least one sensed weather value to validate and/or adjust the calculated weather values. Additionally, the processor 250 can identify trends of the sensed weather values and the calculated weather values over time and/or location. A single processor 250 is shown, but it should be understood that the processing can occur on multiple processors in multiple locations.

For an embodiment, the ET value at the point or area is calculated from point data, grids, or a continuous N-dimensional continuous function. Additional weather factors can also be used in both weather value and ET value calculations.

The ET value can be used to control, for example, an irrigation system 240 that in turn controls irrigation of an irrigation area 230. The ET value provides an accurate representation of the water demand at a local area, such as, the irrigation area 230.

The ET value is calculated based on a number of weather values including, for example, temperature, wind speed, humidity and solar radiation. The number of weather values may change depending on the methodology that is used to calculate the ET value. The weather measurement systems 210, 212, 214, 216 may collectively provide information on these parameters or the parameters can be calculated based on the measurement systems 210, 212, 214, 216 or other information, such as topography. Each weather value measurement systems 210, 212, 214, 216 may provide information corresponding to one or more parameters. The information can be used to compute the ET value. Data from weather measurement systems 210, 212, 214, 216 is useful because the area 230 in which the irrigation system 240 is located may not have sufficient measuring apparatus to derive information that is needed to determine the ET value in the irrigation area 230. Also, the weather measurement systems 210, 212, 214, 216 can be provide input values for the weather calculation process even if the weather values are not physically near or do not climatologically represent the target irrigation location 230.

The resource demand system can additionally include a System Manager 270. The System Manager 270 may access the calculation results of the processor and/or modify the processor validation methodology. This may allow for subjective unmeasured parameters, such a turf quality, to be an input into the processor 250. This allows for adaptive feedback based on either observed parameters and/or external goals such a matching a budget.

Figure 3:
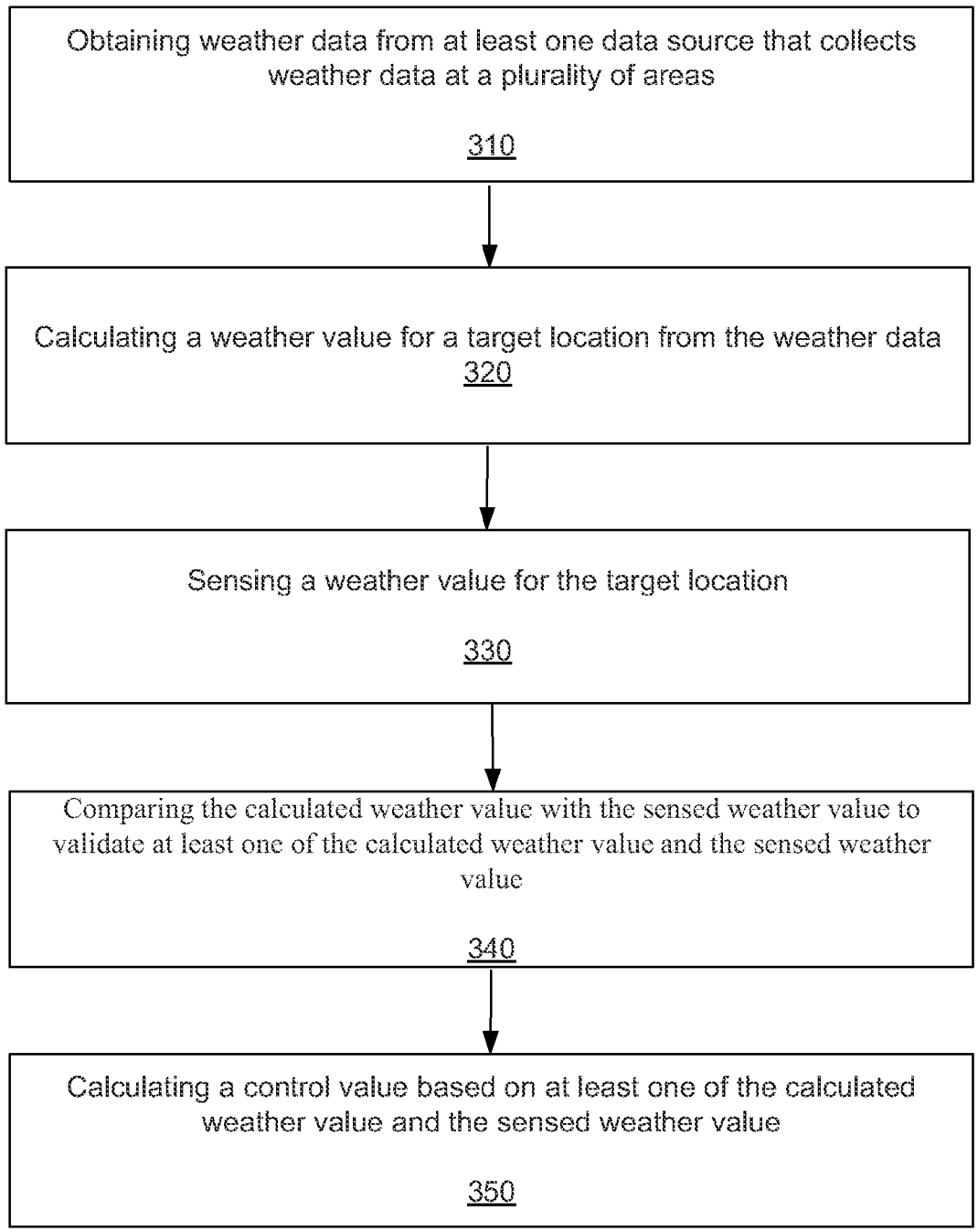
FIG. 3 is a flow chart that includes steps of an example of a method of controlling a resource demand system.

FIG. 3 is a flow chart that includes steps of an example of a method of controlling a resource demand system. A first step 310 includes obtaining weather data from at least one data source that collects weather data at a plurality of areas. An embodiment includes a plurality of data sources collecting weather data at a plurality of areas. A second step 320 includes calculating a weather value for a target location from the weather data. A third step 330 includes sensing a weather value for the target location. A fourth step 340 includes a validation step whereby the calculated weather value and the sensed weather value are validated against each other. A fifth step 350 includes calculating a control value based on at least one of the calculated weather value and the sensed weather value. It should be noted that a control value can also be determined based a correlated value based on at least one of the calculated weather value and the sensed weather value.

As previously described, the calculated weather values can include barometric pressure, humidity, wind speed, wind direction, precipitation, solar radiation, ground temperature, air temperature, soil moisture, evapotranspiration (ET) along with the date, time and location that the weather values were calculated.

Embodiments include the calculating temperature for a location. One embodiment might be to gather air temperature measurements from at least two weather measurement devices. Then calculate the air temperature measurement by taking a distance weighted average between the weather stations. Another embodiment might be to gather air temperature measurements from at least one weather measurement device then calculate a temperature for a target location based on a temperature lapse rate methodology. There are many calculation methodologies known in the art to calculate a specific weather value (such as barometric pressure, humidity, wind speed, wind direction, precipitation, solar radiation, ground temperature, air temperature, soil moisture, evapotranspiration) from remote weather values. These calculations may be based on mathematical functions or require numerical weather models such as those previously described.

Embodiments include the control value being provided to a control device that controls the resource demand system. That is, the calculated control value is provided, for example, to an irrigation target location. The calculated control value can be provided directly to a control device controlling the target location. Alternatively and/or additionally, the calculated control value can be provided to a system manager who may indirectly provide the calculated control value to the control device. Alternatively and/or additionally, the calculated control value can be provided to a system manager or other processor who may use the calculated control value for purposes other than controlling the resource demand system. Alternatively and/or additionally, the calculated control value can be provided indirectly, such as on a website, and subsequently used to control a resource demand system.

As described, the calculated weather value is validated with the sensed weather value. The validation can include comparing the calculated weather value with the sensed weather value. If the comparison reveals that the calculated weather value is different than the sensed weather value, various processes can be performed to identify whether the calculated weather value is not accurate, or whether the sensed weather value is not accurate.

For example, if the calculated weather value representing the target location vs. the sensed weather value representing the target location is determined to be outside a sensed margin, then a comparison can be made between a calculated weather value at a collected weather data location with collected weather data representative of the collected weather data location. If this comparison is within a collected weather data margin, then it is concluded that the sensed weather value is erroneous. It should also be noted that the collected weather data margin may vary depending on the type and associated quality of the collected weather data source.

The sensed margin and collected weather data margin can be based on the type of sensor, sensor location, sensor age, and/or sensor quality. Also, the sensed margin and collected weather data margin can be adaptable based on other sensors that may provide representative weather value for that same location.

For an embodiment, if the sensed weather value is determined to be erroneous, then an alert can be provided to indicate that a sensor that senses the weather value is faulty. Additionally, the calculated control value can be based solely on the calculated weather value including setting it to the calculated weather value. The alert can be provided to the sensor maintainer and or a person whose system may be affected and/or other resource demand system management process. The alert can be provided by many communication and notification systems including but not limited to: email, text messages, webservice, social networks, and or desktop pop-up alerts.

If the comparison yields a difference between the calculated weather value representing a collected weather data location and collected weather data that is outside a collected weather data margin, then it is concluded that the calculated weather value is erroneous. If the calculated weather value is determined to be erroneous, then an alert can be provided that indicates that the calculated weather value is erroneous. Additionally, the calculated control value can be based solely on the sensed weather value including setting it to the sensed weather value. The alert can be provided to the sensor maintainer and or a person whose system may be affected and/or other resource demand system management process.

Another embodiment includes comparing a plurality of calculated weather values against sensed weather values over time to establish a trend. For example, if over time a difference between the calculated weather values and the sensed weather values are determined to be anomalous, then a sensor that generates the sensed weather value can be validated, and the sensed weather value can be used to calculate the control value.

For another embodiment if over time a difference between the calculated weather value and the sensed weather value is determined to be continuous, then which of the calculated weather value and the sensed weather value is erroneous is determined. For one embodiment, determining which of the calculated weather value and the sensed weather value is erroneous includes comparing a calculated weather value at a collected weather data location with collected weather data, if within a collected weather data margin, then it can be concluded that the sensed weather value is erroneous. If outside the collected weather data margin, then it can be concluded that the calculated weather value is erroneous.

Trends may be used in determining refinements in model both process, data inputs and data outputs, quality of sensors, environment influences on sensor quality, location based anomalies, impact of climate change on both model and sensor assumptions, seasonality of model and/or sensor values, periodicity of model and sensor weather values.

Additional embodiments include modifying the control value based on at least one landscape specific parameter.

The landscape specific parameters can be used, for example, for generating a plurality of sub-target control values for a plurality of sub-target locations based the control value and at least one landscape specific parameter.

Figure 4:
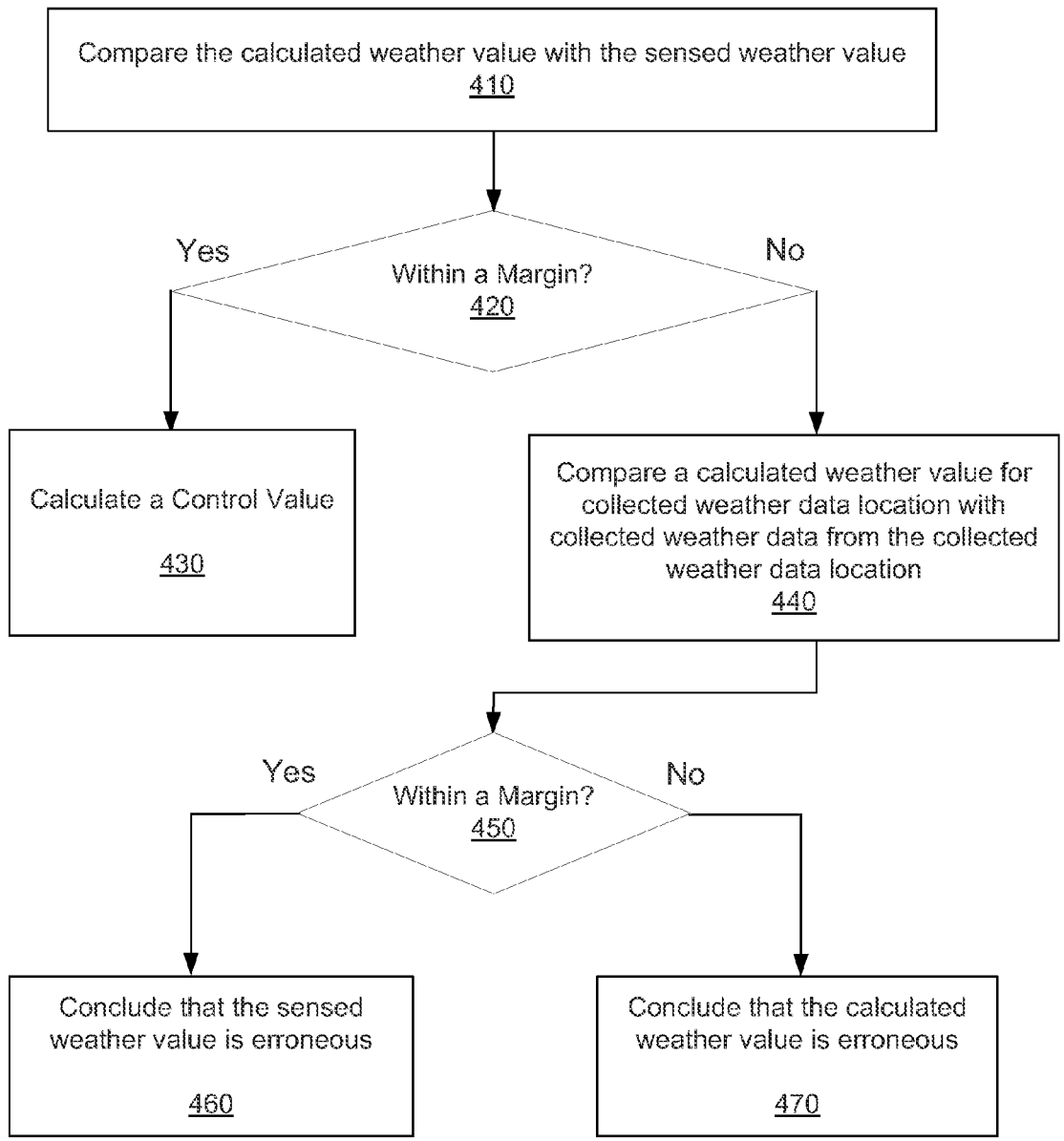
FIG. 4 is a flow chart that includes steps of an example of a method of comparing the calculated weather value and the sensed weather value.

FIG. 4 is a flow chart that includes steps of an example of a method of comparing the calculated weather value and the sensed weather value. A first step 410 includes comparing the calculated weather value with the sensed weather value. A second step 420 includes determining weather the calculated value is within a sensed margin. If the calculated value is within the sensed margin, then step 430 includes calculating the control value. If the calculated value is not within the sensed margin, the step 440 includes comparing a calculated weather value for a collected weather data location with collected weather data from the collected weather data location. If within a collected weather data margin, then a step 460 includes concluding that the sensed weather value is erroneous. If outside the collected weather data margin, then a step 470 includes concluding that the calculated weather value is erroneous.

Figure 5:
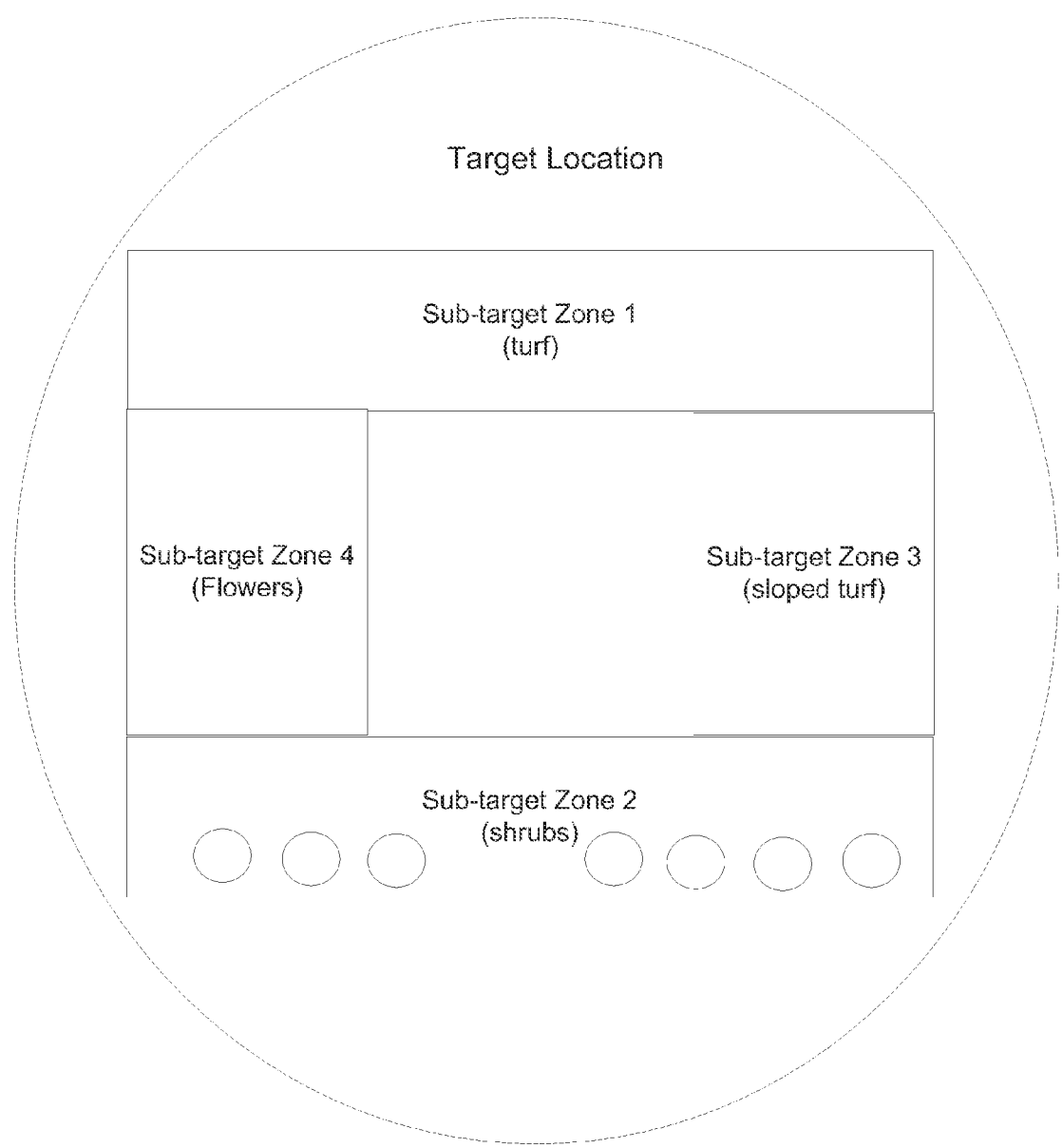
FIG. 5 shows an example of a target location that includes sub-target locations, wherein landscape specific parameters of the sub-target locations influence control values of the target location.

FIG. 5 shows an example of a target location that includes sub-target locations, wherein landscape specific parameters of the sub-target locations influences control values of the target location. As shown, the exemplary target location includes various sub-targets that can be defined, for example, as zones 1, 2, 3, 4. Each of the different zones can include different water demand factors. As previously described, landscape specific parameters can be used, for example, for generating a plurality of sub-target control values for a plurality of sub-target locations based the control value and at least one landscape specific parameter. Another example, a control value can be used with a sub-target sensed value to refine or determine the watering demand requirements. For example, if a soil moisture probe was installed at each of the sub-target locations, then a control value can be used to determine the sub-target water demand requirements based on the sensed soil moisture value at each sub-target location. Also, the control value can be used to calculate the water demand requirements for a sub-target location based on a calculation using the demand requirements from a different sub-target location. Another example is using the control value from one irrigation area to determine water demand requirements of another irrigation area.

Figure 6:
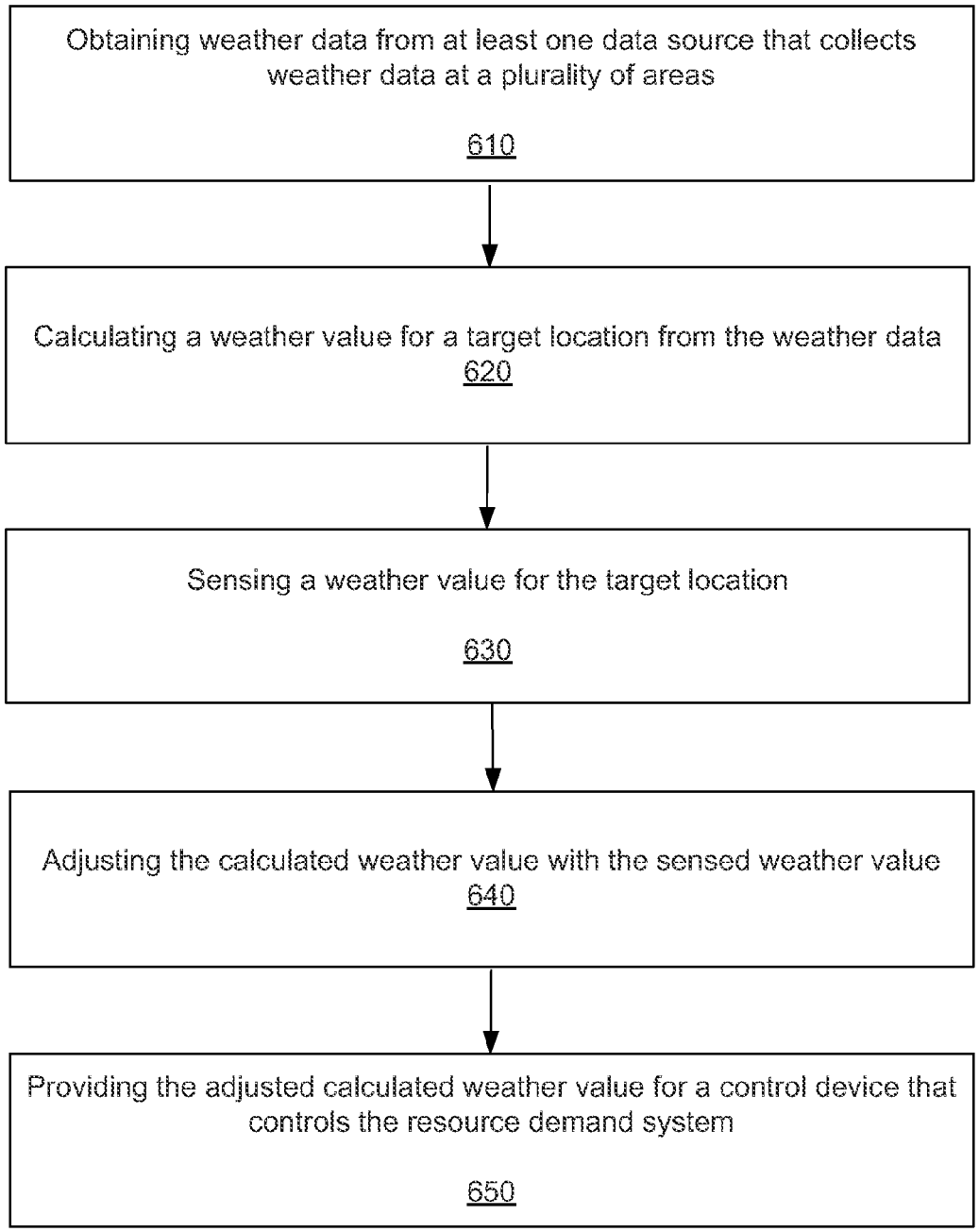
FIG. 6 is a flow chart that includes steps of an example of another method of controlling a resource demand system.

FIG. 6 is a flow chart that includes steps of an example of another method of controlling a resource demand system. A first step 610 includes obtaining weather data from at least one data source that collects weather data at a plurality of areas. A second step 620 includes calculating a weather value for a target location from the weather data. A third step 630 includes sensing a weather value for the target location. A fourth step 640 includes calculating a control value based on at least one of the calculated weather value and the sensed weather value. A fifth step 650 includes providing the control value for a control device that controls the resource demand system.

An embodiment includes determining the control value by adjusting the calculated weather value or sensed weather value. Another embodiment includes adjusting the control value based on the calculated weather value or the sensed weather value based on a historical variation. The historical variation can include a target location specific variation, such as a landscape crop coefficient or a weather pattern historical variation such as wind patterns, or reflectivity of the landscape based on the plants current growing stage. Another embodiment includes adjusting the control value based on the calculated weather value or the sensed weather value based on an event, such as a fire, large social event, or animal migratory patterns.

Figure 7:
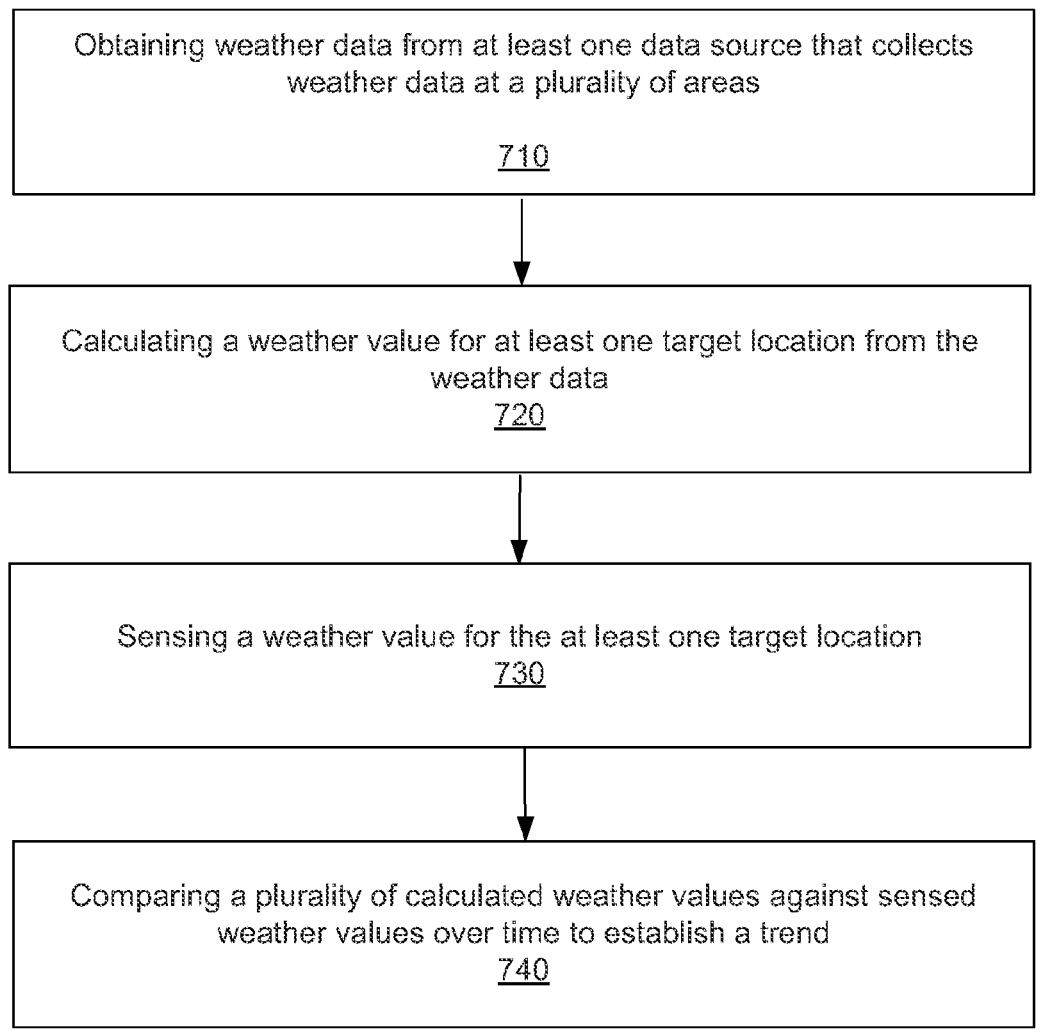
FIG. 7 is a flow chart that includes steps of an example of a method for a resource demand system.

FIG. 7 is a flow chart that includes steps of an example of a method for a resource demand system. A first step 710 includes obtaining weather data from at least one data source that collects weather data at a plurality of areas. A second step 720 includes calculating a weather value for at least one target location from the weather data. A third step 730 includes sensing a weather value at the at least one target location. A fourth step 740 includes comparing a plurality of calculated weather values against sensed weather values to establish a trend over at least one of location and time.

An embodiment includes adaptively updating a method of calculating the weather value based on the established trend. That is, the trends can identify potential problems with the method of calculating the weather value, and therefore, be adaptively updated to improve the calculations. A method of calculating the weather value may include combining input data, such as weather station observations, a physics based weather model, such as WRF, and a processor. The trends can also identify problems with the input data used as part of the calculation or the trends can identify problems with the physics used in the weather model to determine the target locations weather value. The trends can be used to adaptively update which data input should be included in the model, as well as used to adaptively update which physics approach should is appropriate.

An embodiment additionally includes calculating at least one control value base on at least one of the calculated weather values and the sensed weather values, and providing the control value to at least one control device that controls at least one resource demand system. The control value calculation can be adaptively updated based on the trends. For example, the System Manager may adjust the control value calculation based on the average turf quality. As another example, the System Manager may adjust the control value calculation based on the number of times that the target location needs to be mowed, since turf grows based on the amount of water supplied. As another example, the control value can be adaptively adjusted based on the forecasted trends to determine a water budget. As another example, the control value can be adaptively adjusted based on the varying price of water.

Embodiments can alternatively or additionally include providing a visual representation of the established trend. The visual representation can provide location and/or time representations of the trends. That is, the trends can be visually depicted on, for example, a time-line that shows temporal characteristics of the trends.

Figure 8:
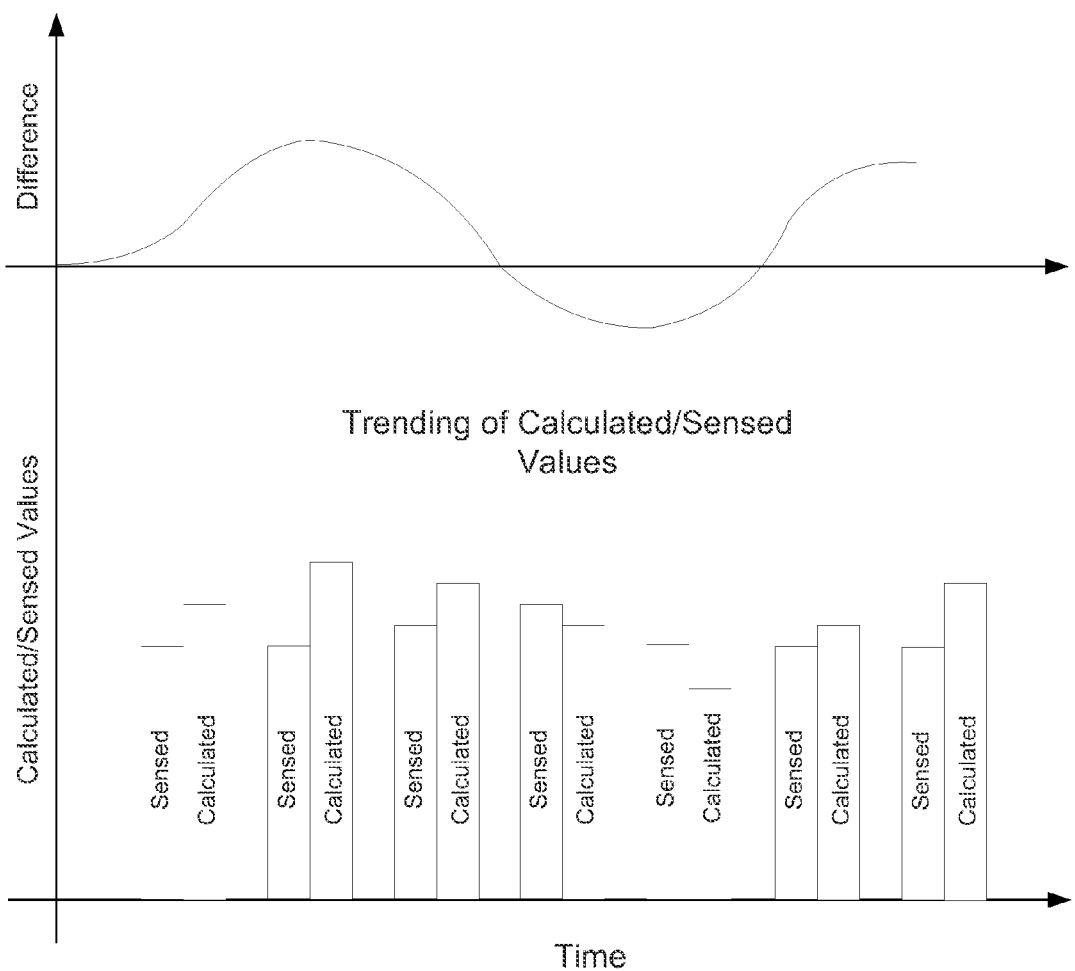
FIG. 8 shows time-lines that depict exemplary trends of calculated weather values and sensed weather values.

FIG. 8 shows time-lines that depict exemplary trends of calculated weather values and sensed weather values. One of the time-lines shows examples of side-by-side sensed and calculated weather values. The other time-line shows a running calculation of the differences between the calculated weather values and the sensed weather values.

Based on the differences, the method of calculating the weather value can be adaptively updated. For example, if a person, such as a System Manager, or a monitoring agent viewed a difference, the person might modify the calculation of the control value. Then the person might further adaptively modify the calculation based on viewing the visual trends over time.

The established trend may provide a representation of the data quality, a geographic trend, a topology variation, urbanization or even human habits. The established trends may be determined by a calculation or by a person. The established trends may be represented mathematically, visually, in data tables, grids, or electronically. The trends may be used to notify a person, such as a System Maintainer, of the trends, or used directly by the resource demand system. The trends can also be used by other systems, such as financial systems, resource management systems, manufacturing systems, engineering systems, monitoring systems or other visualization systems.

It is to be understood that the exemplary embodiments provided are operable on a server. For example, an embodiment includes a program storage device readable by a machine (such as a computer or server), tangibly embodying a program of instructions executable by the machine to perform a method of controlling at least one of the resource demand system described and shown, for example, in FIGS. 3, 4, 6, 7.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed:

1. A method of controlling a resource demand system, comprising:

obtaining weather data from at least one data source that collects weather data at a plurality of areas;

calculating a weather value for a target location from the weather data;

sensing a weather value for the target location;

comparing the calculated weather value with the sensed weather value to validate at least one of the calculated weather value and the sensed weather value;

if a difference between the calculated weather value and the sensed value is greater than a sensed margin, then determining whether the calculated weather value or the sensed weather value is accurate, comprising comparing the calculated weather value with collected weather data, wherein the collected weather data is representative of weather of at least one of the plurality of areas; and calculating a control value based on either the calculated weather value or the sensed weather value depending upon whether the calculated weather value or the sensed weather value is determined to be accurate, wherein the calculated weather value is determined to be erroneous if the difference between the calculated weather value and the sensed value is greater than the sensed margin and the difference between the calculated weather value and the collected weather data is outside of a collected weather data margin.

2. The method of claim 1, further comprising:
providing the control value to a control device that controls the resource demand system.

3. The method of claim 2, further comprising modifying the control value based on at least one landscape specific parameter.

4. The method of claim 1,
further comprising
concluding that the sensed weather value is erroneous if the difference between the calculated weather value and the sensed value is greater than the sensed margin and the difference between the calculated weather value and the collected weather data is within a collected weather data margin.

5. The method of claim 4, further comprising if the sensed weather value is erroneous, then providing an alert that a sensor that senses the sensed weather value is faulty.

6. The method of claim 4, wherein if the sensed weather value is erroneous, then calculating the control value comprises setting the control value to be the calculated weather value.

7. The method of claim 1, further comprising if the calculated weather value is erroneous, then providing an alert that the calculated weather value is erroneous.

8. The method of claim 1, wherein if the calculated weather value is erroneous, then calculating the control value comprises setting the control value to be the sensed weather value.

9. The method of claim 1, wherein comparing the calculated weather value with the sensed weather value to validate at least one of the calculated weather value and the sensed weather value comprises:
comparing a plurality of calculated weather values against sensed weather values over time to establish a trend in differences between the calculated weather values and the sensed weather values.

10. The method of claim 9, wherein if over time the trend in the differences between the calculated weather values and the sensed weather values are determined to be an anomaly, then validating a sensor that generates the sensed weather value, and using the sensed weather value to adjust the calculated weather value.

11. The method of claim 9, wherein if over time the trend in the differences between the calculated weather value and the sensed weather value is determined to be continuous, then determining which of the calculated weather value and the sensed weather value is erroneous.

12. The method of claim 11, wherein determining which of the calculated weather value and the sensed weather value is erroneous comprises comparing a calculated weather value for a collected weather data location with collected weather data, if within a margin, then concluding that the sensed weather value is erroneous.

13. The method of claim 1, further comprising generating a plurality of sub-target control values for a plurality of sub-target locations based on the control value and at least one landscape specific parameter.

14. A method of controlling a resource demand system, comprising:
obtaining weather data from at least one data source that collects weather data at a plurality of areas;
calculating a weather value for a target location from the weather data;
sensing a weather value for the target location;
comparing the calculated weather value with the sensed weather value to validate at least one of the calculated weather value and the sensed weather value;
if a difference between the calculated weather value and the sensed value is greater than a sensed margin, then determining whether the calculated weather value or the sensed weather value is accurate; and
calculating a control value based on either the calculated weather value or the sensed weather value depending upon whether the calculated weather value or the sensed weather value is determined to be accurate, comprising comparing a plurality of calculated weather values against sensed weather values over time to establish a trend in differences between the calculated weather values and the sensed weather values, wherein if over time the trend in the differences between the calculated weather value and the sensed weather value is determined to be continuous, then determining which of the calculated weather value and the sensed weather value is erroneous, wherein determining which of the calculated weather value and the sensed weather value is erroneous comprises comparing a calculated weather value for collected weather data location with collected weather data, if outside a margin, then concluding that the calculated weather value is erroneous.

15. A method for a resource demand system, comprising:
obtaining weather data from at least one data source that collects weather data at a plurality of areas;
calculating a weather value for at least one target location from the weather data;
sensing at least one weather value for the at least one target location;
comparing a plurality of calculated weather values against the at least one sensed weather value to establish a trend in differences between the calculated weather values and the sensed weather values over at least one of location and time, wherein if over time the trend in the differences between the calculated weather value and the sensed weather value is determined to be continuous, then determining which of the calculated weather value and the sensed weather value is erroneous, wherein determining which of the calculated weather value and the sensed weather value is erroneous comprises comparing a calculated weather value for collected weather data location with collected weather data, if outside a margin, then concluding that the calculated weather value is erroneous.

16. The method of claim 15, further comprising providing a visual representation of the trend in the differences between the calculated weather values and the sensed weather values.

17. The method of claim 16, wherein the visual representation provides location and time representations of the trend in the differences between the calculated weather values and the sensed weather values.

18. A method of controlling a resource demand system, comprising:
  obtaining, by a processor, weather data from at least one data source that collects weather data at a plurality of areas;
  calculating, by the processor, a weather value for a target location from the weather data;
  comparing, by the processor, the calculated weather value with a sensed weather value to validate at least one of the calculated weather value and the sensed weather value; wherein
  if a difference between the calculated weather value and the sensed value is greater than a sensed margin, then determining, by the processor, whether the calculated weather value is accurate, comprising comparing the calculated weather value with collected weather data, wherein the collected weather data is representative of weather of at least one of the plurality of areas; and
  calculating, by the processor, a control value based on either the calculated weather value or the sensed weather value depending on whether a difference between the calculated weather value and the collected weather data is within a collected weather data margin or not, wherein the calculated weather value is determined to be erroneous if the difference between the calculated weather value and the sensed value is greater than a sensed margin and the difference between the calculated weather value and the collected weather data is outside of a collected weather data margin.

19. A resource demand system, comprising:
  at least one data source that collects weather data at a plurality of areas;
  a sensor sensing a weather value for the target location;
  a controller operative to:
  calculate a weather value for a target location from the weather data;
  compare the calculated weather value with the sensed weather value to validate at least one of the calculated weather value and the sensed weather value;
  determine whether the calculated weather value is accurate if a difference between the calculated weather value and the sensed value is greater than a sensed margin, comprising comparing the calculated weather value with collected weather data, wherein the collected weather data is representative of weather of at least one of the plurality of areas; and
  calculate a control value based on either the calculated weather value or the sensed weather value depending upon whether the calculated weather value or the sensed weather value is determined to be accurate, wherein the calculated weather value is determined to be erroneous if the difference between the calculated weather value and the sensed value is greater than the sensed margin and the difference between the calculated weather value and the collected weather data is outside of a collected weather data margin.

* * * * *